Feb. 6, 1945.   A. W. KLOMP   2,368,846
ROTARY TOOL HEAD
Filed July 31, 1943
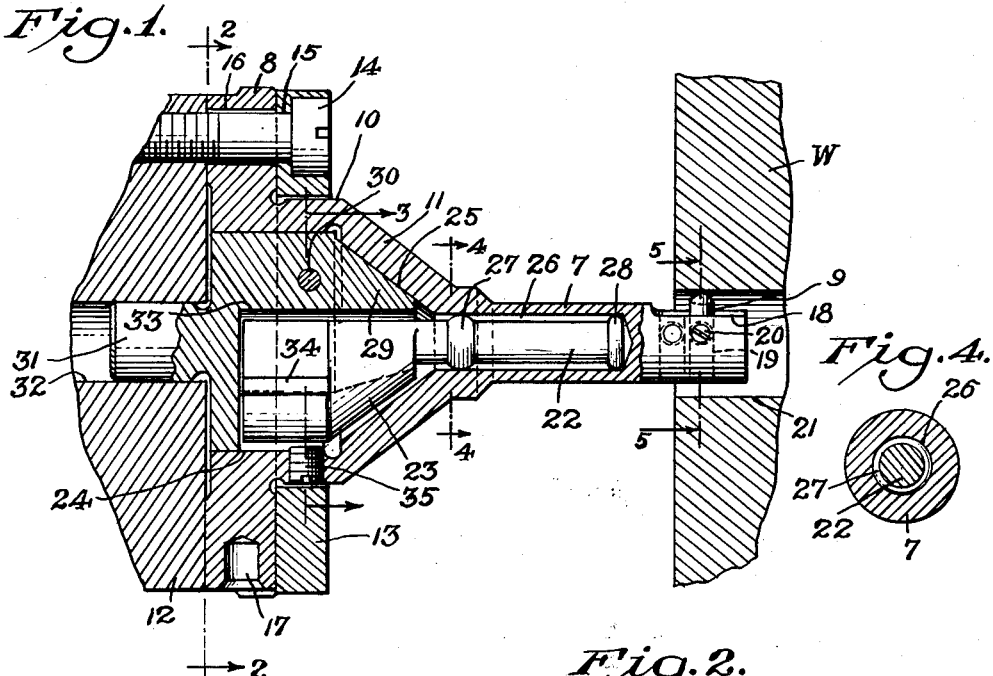
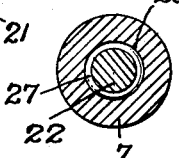
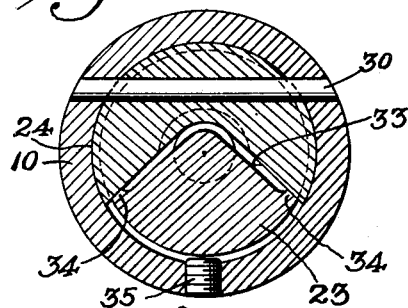
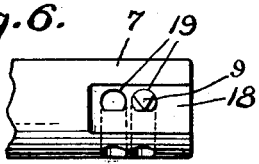
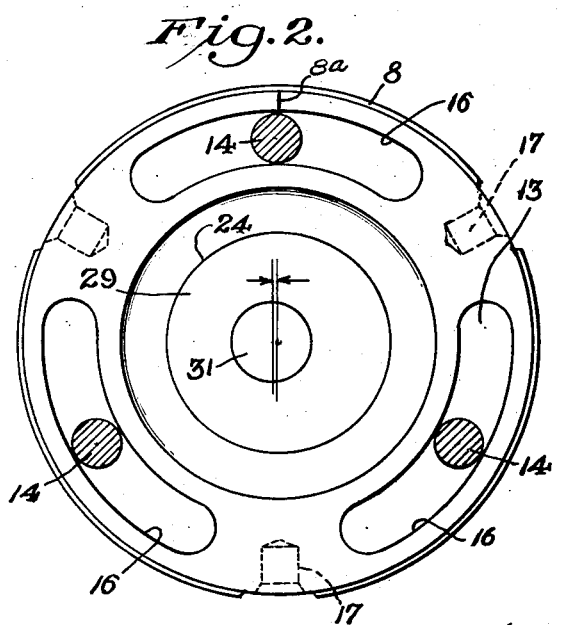
Inventor
Alfred W. Klomp
By Parker, Carlson, Pitzner & Hubbard
Attorneys Patented Feb. 6, 1945

2,368,846

UNITED STATES PATENT OFFICE 2,368,846

ROTARY TOOL HEAD

Alfred W. Klomp, Detroit, Mich., assignor to Ex-Cell-O Corporation, Detroit, Mich., a corporation of Michigan Application July 31, 1943, Serial No. 496,876

13 Claims. (Cl. 77—58)

The present invention relates generally to improvements in rotary tool heads, and has particular reference to boring tool heads of the type having means for automatically locating a laterally projecting tool in radially projected position during the boring cut and in radially retracted position, to avoid contact with the finished work surface, during withdrawal of the tool from the work bore.

One of the objects of the present invention is to provide a novel rotary boring tool head in which a centrifugal weight acts in response to rotation and in opposition to deflection pressure in the tool support to project the tool radially into predetermined cutting position.

Another object is to provide a new and improved tool head of the foregoing character which is simple, compact and inexpensive in construction, and which comprises a comparatively small number of parts arranged in substantial dynamic balance.

Further objects and advantages will become apparent as the description proceeds.

In the accompanying drawing,

Figure 1 is a fragmentary axial sectional view of a boring tool head embodying the features of my invention.

Fig. 2 is a face view of the mounting end of the tool head taken substantially along line 2—2 of Fig. 1.

Figs. 3, 4 and 5 are transverse sectional views of the tool head taken respectively along line 3—3, 4—4 and 5—5 of Fig. 1.

Fig. 6 is a fragmentary side view of the outer end of the tool support.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawing, the tool head constituting the exemplary embodiment of the invention comprises a suitable axial boring bar or quill 7 which is rigid at one end with a concentric mounting flange 8, and which is adapted at the other end to support a laterally projecting single point or fly tool 9. Preferably, the base end of the bar 7 is formed integral with the mounting flange 8, and is diametrically enlarged to provide a cylindrical portion 10 adjoining the flange and an outer conical portion 11 tapering from the cylindrical portion.

The mounting flange 8 is adapted to be removably secured to a suitable support, such for example as a face plate 12 on a rotary drive spindle (not shown). In the present instance, the mounting flange 8 is adjustably clamped against the end surface of the face plate 12 by means of a clamp ring 13 encircling the cylindrical portion 10 of the bar enlargement. A plurality of bolts 14 extend through holes 15 in the ring 13, and loosely through annularly arranged arcuate slots 16 in the mounting flange 8, and are threaded into the face plate 12. If desired, the holes 15 in the clamp ring 13 may be counterbored to receive the heads of the bolts 14. When tightened, the bolts 14 serve to secure the tool head to the spindle for rotation therewith. When the bolts 14 are loosened, the arcuate slots 16 permit relative angular adjustment of the tool head on the spindle. To facilitate such adjustment, the periphery of the mounting flange 8 is knurled, and also a series of circumferentially spaced holes 17 are formed in the flange for insertion of a suitable hand tool (not shown).

The free or outer end of the bar or quill 7 is formed on one side with a flat surface 18 providing a cutting clearance, and with two longitudinally spaced transverse bores 19, constituting tool sockets, opening therethrough to said surface. The boring tool 9 may be inserted in either of the sockets 19, and after adjustment to the desired radial dimension is secured in position by means of a set screw 20.

The tool 9 is adapted specifically for boring operations, for example to remove stock to a predetermined depth from a hole 21 in a workpiece W. In a conventional boring cycle, the tool 9 is revolved, and is simultaneously advanced axially in a boring stroke through the hole 21. At the end of the boring stroke, the rotation is stopped, and the tool 9 is withdrawn idly back through the finished bore 21 in a return stroke.

The present invention comprises novel means automatically operable to project the tool 9 radially into cutting position for the forward boring stroke, and to retract the tool radially for the return stroke so as to avoid contacting the finished work surface and forming a tool mark or drag-out line therein. Broadly stated, the tool is radially projected into cutting position by flexing or deflecting the free outer end of the bar 7 laterally from the normal or neutral axis in the same general direction in which the tool extends, and such deflection is effected by means operable in response to centrifugal force when the tool head is rotated at boring speed. Due to the resiliency of the bar 7, lateral flexure sets up a deflection pressure which opposes the centrifugally actuated means, and which serves to return the bar to normal position upon cessation of the centrifugal force.

The centrifugally operated deflecting means is enclosed completely within the tool head, and, in its preferred form, comprises a longitudinally extending lever 22 of the first order having a centrifugal weight 23 on one arm and bearing at the end of the other arm laterally against the boring bar 7.

The mounted end of the tool head is hollow to provide a housing for the centrifugal weight 23, and more particularly is formed with a large cylindrical bore 24 opening axially through the mounting flange 8 and the base portion 10, and with a tapered bore extension 25 in the base portion 11. The projecting portion of the boring bar 7 is formed with an axial bore 26 opening to the bore extension 25. Preferably, the centrifugal weight 23 is a cylindrical segment tapered at one end to conform peripherally to the internal shape of the enclosing housing, and the axis of the segment when at rest is substantially coincident with the axis of the bores 24, 25 and 26.

The lever 22 preferably consists of a rigid cylindrical bar extending into the bore 26. Formed on the lever 22 intermediate the ends is a laterally rounded peripheral rib or ball section 27 which is in bearing engagement with the surface of the bore 26 to constitute the fulcrum. Another laterally rounded peripheral rib 28 is formed on the extreme end of the lever 22 opposite the weight 23, and engages the surface of the bore 26 adjacent the free end of the bar 7 to constitute the point at which the deflecting force is applied.

The centrifugal weight 23 is confined within the enclosing housing against substantial relative rotation and to project laterally in a direction generally opposite to the tool 9. Rigidly secured within the bore 24 is a closely fitting cylindrical plug 29 having a tapered inner end, and constituting a balancing weight. In the present instance, the plug 29 is held in position by means of a transverse pin 30 extending therethrough and anchored at opposite ends in the walls of the base portion 10.

The plug 29 is formed on its outer end with an eccentrically disposed cylindrical pilot pin 31 extending with a snug fit into a bore 32 in the face plate 12 and slightly offset from the axis of rotation. As a result, the tool head may be readily adjusted relative to the axis of rotation by rotatably adjusting the mounting flange 8 relative to a reference mark 8a.

One side of the plug 29 is formed with a segmental recess 33 which is generally complementary in shape to the centrifugal weight 23, and in which the weight is confined with limited clearance for radial movement in response to variations in centrifugal force. The sides of the recess 33 are spaced closely to the sides of the weight 23, and serve to constrain the weight against independent rotation except for a limited extent of lost motion permitted by the clearance between the parts. Preferably, narrow bearing ribs 34 are formed on opposite sides of the weight 23 for abutting engagement respectively with the sides of the recess 33.

A stop screw 35 is adjustably threaded through the wall of the base portion 10 into the recess 33 for engagement by the outer end of the weight 23 to limit the extent of outward radial movement, and thereby to locate positively the cutting position of the tool 9.

The operation of the tool head will be apparent from the foregoing description. When the tool head is not rotating, the boring bar 7 assumes its normal position, on a neutral axis which preferably is coincident with the normal axis of rotation or slightly eccentric thereto depending on the adjustment of the mounting flange 8, and the centrifugal weight 23 is located inwardly away from the positive stop 35. Upon rotating the tool head at boring speed, the weight 23 is moved outwardly by centrifugal force into engagement with the positive stop 35, and in this movement oscillates the lever 22 about the fulcrum 27 to impart a deflecting force at 28 against the outer end portion of the boring bar 7. This force overcomes the normal resiliency of the bar, and deflects it laterally to increase the radial projection of the boring tool 9 into normal cutting position. The revolving tool 9 is advanced in a boring stroke through the work W, and at the end of the cut, the spindle rotation is stopped. Upon stopping rotation or reducing the speed of rotation to a predetermined point, the deflection force stored in the boring bar 7 will return the latter into normal position, and thereby retract the tool 9 radially within the cutting circle of revolution, so that the tool head can be withdrawn through the work bore without the tool contacting the finished bore surface.

The tool head is simple and compact in construction and comprises very few parts. By reason of the balancing weight 29, which compensates for the offset location of the centrifugal weight 23, the structure of the tool head is substantially in dynamic balance.

I claim as my invention:

1. In a boring tool head adapted to be secured coaxially to a drive spindle for rotation therewith, said tool head comprising an elongated normally axial boring bar, a laterally projecting boring tool mounted in the outer end of said bar, centrifugally actuated means responsive to the rotation of said tool head for resiliently deflecting the outer end of said bar laterally out of concentric relation to the axis of rotation so as to increase the circle of revolution of said tool, and adjustable means for positively limiting the extent of deflection of said bar, the deflection pressure created in said bar opposing the force of said centrifugally actuated means and acting upon cessation of rotation of said tool head to restore said bar to normal position so as to reduce the circle of revolution of said tool.

2. In a rotary boring tool head comprising a longitudinal boring bar adapted to support a laterally projecting boring tool in the outer end, centrifugally actuated means responsive to the rotation of said tool head for deflecting the outer end of said bar laterally out of normal position so as to increase the radial projection of said tool relative to the axis of rotation, and means for limiting the extent of deflection of said bar, the deflection pressure created in said bar opposing the force of said centrifugally actuated means and acting upon cessation of rotation of said tool head to restore said bar to normal position so as to reduce the radial projection of said tool.

3. In a rotary boring tool head comprising a longitudinal boring bar adapted to support a laterally projecting boring tool, and centrifugally actuated means responsive to the rotation of said tool head for deflecting said bar laterally out of normal position so as to increase the radial projection of said tool relative to the axis of rotation, the deflection pressure created in said bar opposing the force of said centrifugally actuated means and acting upon cessation of rotation of said tool head to restore said bar to said normal position so as to reduce the radial projection of said tool.

4. In a rotary boring tool head comprising a longitudinal normally axial boring bar adapted to support a laterally projecting boring tool in the outer end, centrifugally actuated means entirely enclosed within the tool head and responsive to the rotation of said tool head for deflecting the outer end of said bar laterally against its resiliency out of concentric relation to the axis of rotation so as to increase the circle of revolution of said tool, the deflection pressure created in said bar opposing the force of said centrifugally actuated means and tending to restore said bar to normal position so as to reduce the circle of revolution of said tool.

5. In a rotary boring tool head comprising an elongated normally axial boring bar formed at one end with a hollow housing and peripheral mounting flange and adapted at the other end to support a laterally projecting tool and formed with an axial bore opening to said housing, a balancing weight secured in fixed position within said housing and formed in one side with an eccentrically disposed segmental recess, a centrifugal weight disposed in said recess for radial movement and having a shaft extending into said bore, the outer end of said shaft being formed with a rounded peripheral rib in bearing engagement with the surface of said bore to provide a point for the application of force to the boring bar adjacent said tool, an intermediate portion of said shaft being formed with a rounded peripheral rib engaging the surface of said bore at a fulcrum point, and means for limiting the extent of radial movement of said weight, said weight being responsive to the rotation of said tool head to pivot said shaft about said fulcrum point and thereby effect lateral deflection of said boring bar to increase the effective radial projection of said tool, and the resiliency of said bar resisting such deflection and acting to return said bar to normal position upon cessation of rotation to reduce the radial projection of said tool.

6. In a rotary boring tool head comprising an elongated normally axial boring bar formed at one end with a hollow housing and adapted at the other end to support a laterally projecting tool and formed with an axial bore opening to said housing, and an eccentric centrifugal weight disposed in said housing for radial movement and having a shaft extending into said bore, the outer end of said shaft being in bearing engagement with the surface of said bore at a point for the application of force to the boring bar adjacent said tool, an intermediate portion of said shaft engaging the surface of said bore at a fulcrum point, said weight being located at the side of the axis of rotation opposite said tool and being responsive to the rotation of said tool head to pivot said shaft about said fulcrum point and thereby effect lateral deflection of said boring bar to increase the effective radial projection of said tool, and the resiliency of said bar resisting such deflection and acting to return said bar to normal position upon cessation of rotation to reduce the radial projection of said tool.

7. In a rotary boring tool head comprising an elongated normally axial boring bar rigid at one end with a hollow housing and adapted at the other end to support a laterally projecting tool at one side of the axis of rotation and formed with an axial bore opening to said housing, and a centrifugal weight disposed in said housing at the other side of said axis for radial movement and having a shaft extending into said bore, the outer end portion of said shaft being adapted for engagement with the surface of said bore at a point for the application of force to the boring bar adjacent said tool, said weight being responsive to the rotation of said tool head to pivot said shaft about an intermediate fulcrum and thereby effect lateral deflection of said boring bar to increase the effective radial projection of said tool, and the resiliency of said bar resisting such deflection and tending to return said bar to normal position to reduce the radial projection of said tool.

8. In a rotary boring tool head comprising a boring bar rigid at one end with a hollow housing and adapted at the other end to support a laterally projecting tool at one side of the axis of rotation and formed with a longitudinal recess opening to said housing, and a centrifugal weight disposed in said housing at the other side of said axis for radial movement, a lever supporting said weight and extending into said recess, the outer end of said lever being adapted for engagement with the surface of said recess at a point to apply force to the boring bar, said weight being responsive to the rotation of said tool head to pivot said lever and thereby effect lateral deflection of said boring bar to increase the effective radial projection of said tool, and the resiliency of said bar resisting such deflection and tending to return said bar to normal position upon cessation of rotation to reduce the radial projection of said tool.

9. In a rotary boring tool head comprising a boring bar rigid at one end with a hollow housing and adapted at the other end to support a laterally projecting tool at one side of the axis of rotation and formed with a longitudinal recess opening to said housing, and a centrifugal weight disposed in said housing at the other side of said axis for radial movement, a lever supporting said weight and extending into said recess, the outer end of said lever being adapted for engagement with the surface of said recess at a point for the application of force to the boring bar, said weight being responsive to the rotation of said tool head to pivot said lever and thereby effect lateral deflection of said boring bar to increase the effective radial projection of said tool, and the resiliency of said bar resisting such deflection and tending to return said bar to normal position upon cessation of rotation to reduce the radial projection of said tool, and a second weight in said housing opposite said centrifugal weight to establish dynamic balance of said tool head.

10. In a rotary boring tool head comprising a boring bar rigid at one end with a hollow housing and adapted at the other end to support a laterally projecting tool at one side of the axis of rotation and formed with a longitudinal recess opening to said housing, and a centrifugal weight disposed in said housing at the other side of said axis for radial movement, a lever supporting said weight and extending into said recess, the outer end of said lever being adapted for engagement with the surface of said recess for the application of force to the boring bar, said weight being responsive to the rotation of said tool head to pivot said lever and thereby effect lateral deflection of said boring bar to increase the effective radial projection of said tool, and the resiliency of said bar resisting such deflection and tending to return said bar to normal position upon cessation of rotation to reduce the radial projection of said tool, means for confining said weight against rotation within said housing, and adjustable means for positively limiting the deflection of said bar by said weight.

11. In a rotary boring tool head comprising a boring bar adapted at one end to support a laterally projecting tool and formed with an axial bore opening to the other end, a centrifugal weight disposed eccentrically of the axis of rotation oppositely to said tool for radial movement, a lever supporting said weight at one end and extending at the other end into said bore, said lever being adapted for engagement with the surface of said bore at a point for application of force to the boring bar adjacent said tool, and means for limiting the extent of radial movement of said weight, said weight being responsive to the rotation of said tool head to pivot said lever and thereby effect lateral deflection of said boring bar to increase the effective radial projection of said tool.

12. In a rotary boring tool head, in combination, a housing having an eccentric segmental recess in one side, a resilient axial boring bar connected to said housing and having a longitudinal recess opening to said segmental recess and adapted to support a radially projecting tool, a lever extending from said segmental recess into said longitudinal recess and fulcrumed intermediate its ends in said longitudinal recess, and an eccentric centrifugal weight in the form of a cylindrical segment fixed to one end of said lever and disposed for radial movement in said segmental recess, the other end of said lever bearing in said longitudinal recess.

13. In a rotary boring tool head comprising a longitudinal boring bar adapted to support a laterally projecting boring tool in the outer end, a lever extending longitudinally into the other end of said bar and having bearing engagement with said bar at two longitudinally spaced points, and an eccentric centrifugal weight connected to the lever externally of said bar.

ALFRED W. KLOMP.